US005698297A

United States Patent [19]

Pitts et al.

[11] Patent Number: 5,698,297

[45] Date of Patent: *Dec. 16, 1997

[54] IMPROVED METHOD OF APPLYING GUIDE MARKINGS TO WRITING SURFACES

[75] Inventors: Barbara R. Pitts, Plano; Mary R. Sarao, Dallas, both of Tex.

[73] Assignee: Second Sight Enterprises, Inc., Plano, Tex.

[ * ] Notice: The term of this patent shall not extend beyond the expiration date of Pat. No. 5,595,929.

[21] Appl. No.: 715,006

[22] Filed: Sep. 17, 1996

Related U.S. Application Data

[63] Continuation of Ser. No. 501,385, Jul. 12, 1995, Pat. No. 5,595,827.

[51] Int. Cl.[6] ........ B32B 9/00

[52] U.S. Cl. ........ 428/195; 428/153; 428/155; 428/167; 428/204; 428/206; 428/207; 428/537.5; 434/85; 434/90; 434/128; 283/62; 283/115; 283/117; 40/595; 33/18.1; 33/19.2

[58] Field of Search ........ 428/153, 155, 428/156, 167, 537.5, 204, 206, 207, 195, 172, 321.1; 40/595; 283/62, 115, 117; 434/85, 90, 128; 33/18.1, 19.1, 19.2

[56] References Cited

U.S. PATENT DOCUMENTS

D. 7,962 12/1874 Lawrence .
182,065 9/1876 Gilman .
1,151,782 8/1915 Greeley .
1,206,795 12/1916 Barrington .
1,280,094 9/1918 Smith, Jr. ........ 434/85
1,503,837 8/1924 Lancaster .
1,600,474 9/1926 Johnson .
3,939,588 2/1976 Hockaday .
4,001,941 1/1977 Cruz .
4,470,197 9/1984 Pagalles .
4,775,169 10/1988 Barth .
4,798,537 1/1989 Ragouzis .
4,986,573 1/1991 Brunhoefer .
5,045,378 9/1991 Libby ........ 428/153

FOREIGN PATENT DOCUMENTS

42542/72 7/1971 Australia .

OTHER PUBLICATIONS

Clearpoint Paper Co.; CLEARPRINT "Fade–Out" pad brochure; Clearprint No. 1000H–10; undated.

*Primary Examiner*—Patrick Ryan
*Assistant Examiner*—Abraham Bahta
*Attorney, Agent, or Firm*—Guy V. Manning

[57] ABSTRACT

Improved method of applying guide markings to a writing surface such as posterboard. The guide markings are visually perceptible at a writing distance away from the posterboard, and substantially imperceptible at a viewing distance away from the—writing surface.

13 Claims, 1 Drawing Sheet

IMPROVED METHOD OF APPLYING GUIDE MARKINGS TO WRITING SURFACES

This is a Continuation of application Ser. No. 08/501,385 filed Jul. 12, 1995, now U.S. Pat. No. 5,595,827.

FIELD OF THE INVENTION

This invention relates to an improved posterboard which may be used to create posters, signs, and other displays of visual material.

BACKGROUND ART

Posterboard is a standardized product that is used to create all types of hand-lettered and hand-drawn signs and displays, such as posters. A problem in the use of conventional posterboard is that evenly-spaced letters, and evenly-spaced lines, are virtually impossible to achieve without pre-measuring and pre-marking the posterboard with guide markings. Typically, a user will pre-mark and pre-measure a posterboard with faint pencil lines to enable even lettering and line spacing, and then the pencil lines are erased upon finishing the project. The use of pencil lines for guide markings suffers from a number of substantial drawbacks. The application of pencil lines is time consuming and requires a reasonable amount of precision not available to school children or casual users without drafting equipment. The subsequent erasure of pencil lines is often incomplete and impossible to complete so that there is no visible trace. Erasure of pencil lines often smears the lettering or drawing that has been applied. The use of pencil lines requires a high degree of pre-planning and therefore limits creativity in arrangement as the project progresses.

A number of complicated pre-marking devices are known in the art. These devices are difficult to use as well as expensive to acquire.

In addition, U.S. Pat. No. 5,045,378 to Libby discloses paperboard sheets wherein a grid is permanently deformed into the sheet. Libby requires specialized apparatus for scribing the sheets, and is therefore not suited to production in an economical fashion by conventional and readily available printing equipment. In addition, the permanently deformed or embossed guide marking of Libby interferes with many types of drawing and lettering media, such as pencil and crayons, producing unpredictable visual results.

SUMMARY OF THE INVENTION

The present invention is an improved posterboard having guide marking applied by an ordinary offset printing process. The guide markings are visually perceptible at a writing distance away from the posterboard, but are visually imperceptible at a viewing distance away from the posterboard.

BRIEF DESCRIPTION OF THE DRAWINGS

A more complete understanding of the invention and its advantages will be apparent from the Detailed Description taken in conjunction with the accompanying Drawing in which.

DETAILED DESCRIPTION

Figure 1:
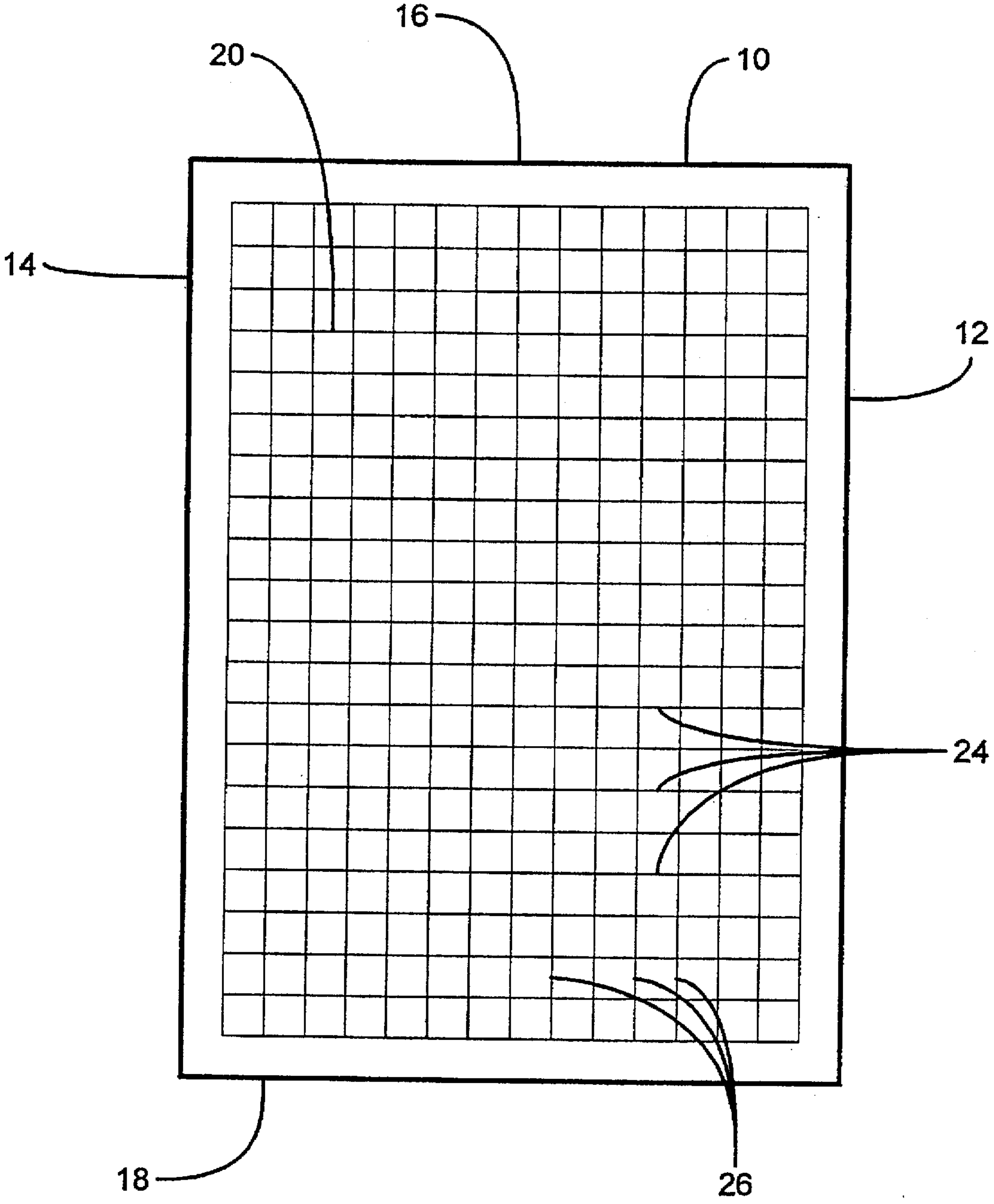
FIG. 1 illustrates a front view of posterboard incorporating the invention.

Referring to FIG. 1, posterboard 10 is rectangular in shape, having vertical side edges 12 and 14, and horizontal top edge 16, horizontal bottom edge 18. Guide markings 20 are applied to the posterboard over substantially all of the area within the side edges 12 and 14, top edge 16 and bottom edge 18. In the preferred embodiment, side markings 20 are composed of a grid 22 printed on posterboard 10. The grid 22 is composed of horizontal lines 24 and vertical lines 26. It will be apparent to those skilled in the art that guide markings other than a grid, such as simple horizontal lines, may also be used to achieve substantially the same results as in the preferred embodiment.

The essential feature of the invention is that the guide markings are visually perceptible at a writing distance away from the posterboard, but are substantially imperceptible at a viewing distance away from the posterboard. In other words, the guide markings are visible to the person lettering or drawing the posterboard, but invisible to subsequent viewers of the posterboard that are a reasonable distance away, such as as least an arm's length away. The desired function is the provision of faintly visible guide lines during creation of the display that "disappear" from view except under close and careful scrutiny. The casual viewer more than an arm's length away from the posterboard cannot see the guide markings. The distance at which the markings become imperceptible is about 24 to 36 inches.

An example of the preferred embodiment of the invention has been prepared from posterboard made by Greenhill and known as TAG board. The guide markings are applied to substantially all of one surface of the posterboard by an ordinary offset printing process. The guide markings are composed of a grid having horizontal and vertical lines of substantially equal thickness and substantially equal spacing. The lines are one point rule weight ($\frac{1}{72}$ inch) thick, and the lines are 0.5 inch apart both horizontally and vertically.

The "disappearing" guide markings effect is achieved by preparing the printing plate by exposure behind a 10% screen. Thus, only 10% of the exposure is applied to the plate that would normally be applied to achieve solid lines. Then, the posterboards are printed with a specially formulated color of ink. In the example, the ink is composed of a 50/50 mixture of PMS silver (Pantone 877) and opaque white. This color of ink, printed with the 10% exposed plate, results in the desired visual character of the guide marking grid.

Whereas, the present invention has been described with the respect to a specific embodiment thereof, it will be understood that various changes and modifications will be suggested to one skilled in the art, and it is intended to encompass such changes and modifications as fall within the scope of the appended claims.

We claim:

1. An improved method of applying guide markings to writing surfaces comprising:

providing a writing surface for a display;

providing an ink; then applying the ink to the writing surface using an ordinary printing process, whereby the guide markings are visually perceptible at a writing distance from the writing surface but imperceptible at a viewing distance from the writing surface.

2. The method of claim 1 wherein the printing process includes using an offset printing plate having an exposure screen which limits the ink applied to the writing surface to a selected exposure substantially less than the exposure necessary to achieve solid lines.

3. The method of claim 2 and including the step of limiting the exposure screen to a 10% exposure.

4. The method of claim 1 wherein the ink is composed partly of a pigment substantially the color of the writing surface and partly composed of a contrasting color pigment.

5. The method of claim 4 and including the step of mixing the ink with a maximum of 50% contrasting color pigment.

6. The method of claim 1 wherein the ink is composed of 50% white and 50% silver pigments.

7. An improved method of applying guide markings to a posterboard writing surface comprising:

providing a posterboard for a display;

providing an ink having a mixture of one color pigment substantially the color of the posterboard and at least one contrasting color pigment; then applying the ink to the posterboard writing surface with an offset printing process, whereby the guide markings are visually perceptible at a writing distance from the posterboard surface but imperceptible at a viewing distance from the posterboard surface.

8. An improved method of creating a display comprising providing a posterboard having a marking surface;

providing an ink having at least two color pigments, one color pigment substantially matching a color of the marking surface; then printing guide lines using the ink on the marking surface; then relying upon the guide lines to mark the display onto the posterboard surface, whereby the guide markings are visually perceptible at a marking distance from the posterboard surface but imperceptible at a viewing distance from the posterboard surface.

9. The method of claim 1 wherein:

the ink forms the guide markings in a faint gray color.

10. The method of claim 7 wherein:

the ink forms the guide markings in a faint gray color.

11. The method of claim 8 wherein:

the ink forms the guide markings in a hint gray color.

12. An improved posterboard comprising:

a rectangular posterboard having vertical side edges and horizontal top edges;

guide markings printed on the posterboard in a faint gray color;

the guide markings being visually perceptible at a writing distance away from the posterboard, and substantially imperceptible at a viewing distance away from the posterboard.

13. An improved posterboard comprising:

a rectangular posterboard having vertical side edges and horizontal top edges;

guide markings applied to substantially all of the surface of the posterboard;

the guide markings composed of a grid printed on the posterboard;

the grid composed of horizontal and vertical lines of substantially equal thickness and substantially equal spacing;

the lines being visually perceptible at a writing distance away from the posterboard, and substantially imperceptible at a viewing distance away from the posterboard;

the lines being printed from an ink providing a faint gray color to the lines.

* * * * *